United States Patent
Congdon et al.

(10) Patent No.: US 9,521,695 B2
(45) Date of Patent: Dec. 13, 2016

(54) INITIALIZING NETWORK ADVERTISEMENTS FROM PROBE REQUESTS

(71) Applicant: Tallac Networks, Inc., Rocklin, CA (US)

(72) Inventors: Paul T. Congdon, Granite Bay, CA (US); Ali Ezzet, Granite Bay, CA (US); William R. Johnson, Meadow Vista, CA (US); Chuck A. Black, Rocklin, CA (US)

(73) Assignee: Tallac Networks, Inc., Rocklin, CA (US)

( * ) Notice: Subject to any disclaimer, the term of this patent is extended or adjusted under 35 U.S.C. 154(b) by 59 days.

(21) Appl. No.: 14/296,358

(22) Filed: Jun. 4, 2014

(65) Prior Publication Data
US 2014/0355523 A1 Dec. 4, 2014

Related U.S. Application Data

(60) Provisional application No. 61/831,005, filed on Jun. 4, 2013.

(51) Int. Cl.
*H04W 76/02* (2009.01)
*H04W 48/12* (2009.01)

(52) U.S. Cl.
CPC ............ *H04W 76/02* (2013.01); *H04W 48/12* (2013.01)

(58) Field of Classification Search
CPC .............................. H04W 48/12; H04W 76/02
See application file for complete search history.

(56) References Cited

U.S. PATENT DOCUMENTS

| 2006/0166669 A1* | 7/2006 | Claussen | H04M 15/00 455/435.3 |
| 2009/0046682 A1* | 2/2009 | Kim | H04W 28/06 370/338 |

OTHER PUBLICATIONS

Hotspot2 ( Wi-Fi Certified Passpoint™ (Release 1) Deployment Guidelines, Version 1.0—Oct. 2012).*
Aboba, B. et al., "The Network Access Identifier", Network Working Group, Request for Comments: 2486, Category: Standards Track (Jan. 1999), pp. 1-8.
Anyfi.net, "The Open Wi-Fi Mobility Platform" (Aug. 30, 2013) pp. 1-34.
Dekok, A. et al., "Remote Authentication Dial-In User Service (RADIUS) Protocol Extensions" Internet Engineering Task Force (IETF), Request for Comments: 6929, Updates: 2865,3575,6158, Category: Standards Track (Apr. 2013), pp. 1-68.

(Continued)

*Primary Examiner* — Hoon J Chung
*Assistant Examiner* — Zhensheng Zhang
(74) *Attorney, Agent, or Firm* — David T. Millers (57) ABSTRACT

A probe request from a wireless station can cause the access point to contact a roaming enablement service and alter the services accessible through the access point. The roaming enablement service can identify preferred services of the wireless station and mediate automated negotiations between the access point and a service provider to determine whether the access point may provide a service from the service provider. Upon successful negotiations, the brokerage service can enable the access point to provide access to the preferred services.

11 Claims, 5 Drawing Sheets

(56) References Cited

OTHER PUBLICATIONS

IEEE Standard for Information Technology "Part 11: Wireless LAN Medium Access Control (MAC) and Physical Layer (PHY) Specifications, Amendment 9: Interworking with External Networks" (2011) pp. 1-208.
Leach, P. et al., "A Universally Unique IDentifier (UUID) URN Namespace" Network Working Group, Request for Comments: 4122, Category: Standards Track (Jul. 2005), pp. 1-32.
Rigney C. et al., "Remote Authentication Dial in User Service (RADIUS)", Network Working Group, Request for Comments: 2865, Category: Standards Track (Jun. 2000), pp. 1-76.
Wi-Fi Alliance Technical Committee, Hotspot 2.0 Technical Task Group, "Hotspot 2.0 (Release 2) Technical Specification, Version 3.15" (2013) pp. 1-204.
Wireless Broadband Alliance, "Wireless Business Exchange Document (CBED) Information Guide", Wireless Interoperability Compliancy Program—2012 Project, (Jul. 16, 2012) Version V1.0, pp. 1-21.
Wireless Broadband Alliance, "Location Feed Format & File Exchange Standard (WRIX-L)" (Jan. 21, 2013) Version 1.2, pp. 1-14.
Wireless Broadband Alliance, "WRIX, Standard Service Specification, Appendix I: WRIX-i Interconnect Test Suite", Version 01.03 (Dec. 2005) pp. 1-18.
Wireless Broadband Alliance, "WRIX, Standard Service Specification, Interconnect Definition" Version 01.05 (Nov. 29, 2012) pp. 1-32.
Wireless Broadband Alliance, "WRIX Standard Service Specification for Interaction among WBA Members, Umbrella Doc." (2007) pp. 1-17.
Wireless Broadband Alliance, "WRIX, Standard Service Specification for Interaction among WBA Members, Clearing" (2013) pp. 1-30.

* cited by examiner

INITIALIZING NETWORK ADVERTISEMENTS FROM PROBE REQUESTS

BACKGROUND

The Wi-Fi Alliance introduced Hotspot 2.0 as an approach to public access Wi-Fi. Passpoint, which is based on the HotSpot 2.0 specification, is the brand for a certification program. In particular, devices such as wireless routers that pass certification testing based on Hotspot 2.0 can be referred to as "Passpoint devices." With the Hotspot 2.0/Passpoint approach, a mobile device such as a mobile telephone, a pad computer, or a laptop computer can automatically join a Wi-Fi subscriber service whenever the mobile device enters a Hotspot 2.0 area that is configured to support the Wi-Fi subscriber service. Wi-Fi subscriber services may provide mobile devices with enhanced communication abilities such as better bandwidth or services-on-demand and may reduce demands on mobile carrier infrastructure, for example, if the mobile device can communicate through the hotspot, instead of the infrastructure of the mobile carrier.

Hotspot 2.0 is based on the IEEE 802.11u Wi-Fi standard, which is a set of protocols to enable cellular-like roaming for Wi-Fi devices. (More specifically, a relevant standard is entitled "IEEE Std 802.11u™-2011-IEEE Standard for Information Technology-Telecommunications and information exchange between systems-Local and Metropolitan networks-specific requirements-Part II: Wireless LAN Medium Access Control (MAC) and Physical Layer (PHY) specifications: Amendment 9: Interworking with External Networks" but is more simply referred to as IEEE Std 802.11u™-2011.) If a mobile device supports 802.11u™-2011 and is subscribed to a Wi-Fi subscriber service available at Hotspot 2.0 locations, the mobile device may be able to roam between Wi-Fi access points and automatically connect to the Wi-Fi subscriber service through the access points.

Key technologies, used in the HotSpot 2.0 and Passpoint, are further described in IEEE Std 802.11u™-2011 and Wi-Fi Alliance Passpoint standard specifications, which are hereby incorporated by reference in their entirety.

SUMMARY

In accordance with an aspect of the invention, a system or method allows bootstrap configuration of a wireless system or access point in a manner specific to a mobile device encountering the wireless system. For example, the mobile device can automatically connect to a service through an access point, without user intervention, even when the service was not available through the access point when the mobile device first encountered the access point.

One method disclosed herein allows a WLAN (Wireless Local Area Network) to advertise the availability of a Service Set IDentifier (SSID), a service, or a service provider associated with a service when a mobile wireless station that may desire that service encounters an access point of the WLAN and before the mobile wireless station invokes an access process such as defined by HotSpot 2.0/Passpoint specifications. A bootstrap process for the advertisement of a service can operate even if a WLAN operator and the provider of the service have not previously established any kind of roaming relationship. The bootstrap availability of an acceptable advertised service can dramatically reduce the number of times a wireless station is blocked from the service or must resort to user intervention to obtain access to the service. The method may also facilitate automated creation of a large number of roaming agreements, with potential financial transactions and benefits, between WLAN operators and service providers.

One specific embodiment provides a mechanism that implements a protocol for automatically identifying or establishing an agreement between a WLAN operator and a service provider and then configuring a WLAN to advertise the service of the service provider, for example, by associating a suitably configured Access Network Query Protocol (ANQP) server to an access point of the WLAN once an agreement between the WLAN operator and the service provider is made. The protocol can exchange information elements among the WLAN operator, the service provider, an ANQP server, and a brokerage service that brokers an agreement between the WLAN operator and the service provider.

A specific embodiment may further provide a mechanism to transport the ANQP request/reply messages between the WLAN operator's equipment and an ANQP server. The IEEE 802.11u standard does not provide any specification of how to communicate ANQP messages between an access point and a remote ANQP server.

Another specific embodiment may provide a mechanism for transmitting information such as a user ID in an IEEE 802.11 probe request. In a typical operation, when a wireless station is seeking access, the wireless station can transmit a probe request that includes an SSID for the service for which the wireless station is looking. The probe request may prompt an access point that is configured to provide access to respond with a probe response that includes the SSID and other additional information that may allow the wireless station to associate with the service corresponding to the SSID. In one implementation of a bootstrap process, a Wi-Fi system may obtain an ID of a user or a wireless station from a probe request and may use the ID to search for configuration information to enable connections through the Wi-Fi system to services associated with the ID. For example, a universally unique ID (UUID) may be encoded in the SSID field of a probe request from a wireless station. Other forms of identifying information (such as a MAC address) may also be part of a probe request. The access point receiving the probe request can use the UUID or other identifying information from the probe request to query a database and identify services for the user or wireless station, and the access point can then automatically configure the WLAN to enable the wireless station to access the identified services. For example, an ANQP server may be readied for subsequent ANQP request messages. Thus, the access point may be automatically configured to allow the user to connect to the user's desired service.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

Some Wireless Local Area Networks (WLANs) may require that a mobile device (sometimes referred to herein as a mobile wireless station) and an access point of the WLAN be preconfigured with all necessary information for a service before the mobile device may use the service through the access point. For example, a wireless station may transmit probe messages seeking access to a desired service. If the desired service is available at an access point receiving the probe message, the access point may reply, and the wireless station can select the service and begin any authentication processes that may be required to obtain access to the service through the access point. If the desired service is not available through the access point, the wireless station may communicate with the access point but may be blocked from access or may need to intervene the user in an attempt to obtain access to the service through the access point.

Roaming agreements that permit WLAN operators to provide services may be established between service providers and WLAN operators. In the cellular world, the FCC mandated the need for roaming agreements across carriers. Standards and procedures such as the GSM Transferred Account Procedure (TAP) provide guidelines for transfer payments for cellular roaming. In the Wi-Fi world, roaming agreements and procedures to handle roaming among WLANs are being defined by the Wireless Broadband Alliance (WBA) through the Interoperability Compliance Program (ICP). "Wireless Roaming Intermediary eXchange (WRIX—i, 1, d & f)" April 2014, generally provides a specification and guidelines for roaming and is hereby incorporated by reference in its entirety. A number of large service providers have also come together to define how roaming may work in the next generation Wi-Fi hotspot architecture.

The IEEE 802.11u standard and the Wi-Fi Alliance Passpoint specification define some aspects of roaming and particularly define the Access Network Query Protocol (ANQP), which allows an IEEE 802.11-compliant access point of a WLAN to advertise information about a service or a network service provider. Once information about a service is thus advertised, an IEEE 802.11-compliant mobile, wireless station may then select the appropriate credentials to authenticate to the WLAN and obtain the services offered by the network service provider. In general, the operator of the WLAN may only legally configure information exchanged by ANQP after an agreement between the network service provider and the WLAN operator is in force. Conventionally, the agreement between the WLAN operator and the service provider is expected to have been established long before a wireless station attempts to obtain and obtains services from the network service provider through the WLAN operator's access point.

While the IEEE 802.11u/Passpoint solution has significantly simplified the process of a mobile user connecting to a WLAN where a service provider already has an agreement with the WLAN operator, the existing solution does not provide any provision for assuring that an agreement is in place when the wireless station roams into the vicinity of the access point. If there is no agreement in place, the wireless station may be blocked from access or may need to use cumbersome schemes involving user intervention to become connected.

Systems and methods described herein allow a WLAN operator to use an identifier (ID) that may be encoded within a probe request from a mobile wireless station to obtain service provider information required to configure ANQP or to otherwise allow the mobile wireless station to access a service of the service provider through the WLAN. A brokerage service may facilitate the information exchange and may dynamically establish the appropriate agreements between the WLAN operator and the service provider even after the wireless station issues a probe request. In particular, an 802.11-compliant access point belonging to the WLAN operator may pass the ID to a database associated with the brokerage service. The brokerage service may in turn use database information to locate and contact the wireless station's network service providers with an offer for the WLAN operator to provide the desired service. Alternatively, the brokerage service may already have data indicating a service provider's requirements for an agreement and may automatically create an agreement if the capabilities and requirements of the WLAN operator and the service provider are compatible. If the network service provider agrees to the terms of the WLAN operator, the service provider can provide the necessary information to the brokerage service so that the brokerage service may configure the WLAN appropriately. Once WLAN is configured, the wireless station may associate and authenticate to the WLAN and obtain service from the network service provider, e.g., according to the procedures that IEEE 802.11 and the Wi-Fi Alliance Passpoint specification define.

One exemplary implementation bootstraps an access point with the configuration necessary to seamlessly connect a mobile wireless station to a Wi-Fi network that supports the HotSpot 2.0/Passpoint process. To connect a user and for the WLAN to participate in the HotSpot 2.0/Passpoint process, an access point of the WLAN may be configured to properly respond to probe requests and ANQP requests from the mobile wireless station. With the exemplary implementation, the access point can be dynamically configured with new information that matches the wireless station's desired network and service so that responses to probe and ANQP requests from the wireless station contain the necessary information to allow automatic network selection and authentication. In particular, the access point may obtain an ID from the mobile wireless station before the Hotspot 2.0/Passpoint process completes or before a non-HotSpot 2.0 wireless station associates, and the access point can use the ID to fetch appropriate information from a brokerage service or other source as needed to complete the connection process.

A bootstrap module associated with an access point can identify a mobile device or a user of the mobile device when the mobile device first encounters the access point. The discovered identity can be used to look up a list of services or service providers that the user or the mobile device may want to access. The access point can then obtain configuration information for the services associated with the user or mobile device and make the services available. In some configurations, a database may maintain a list of identities and for each identity a list of services pre-selected by or for the user or the wireless station corresponding to the identity, and a WLAN operator can contact the database to look up the services for a user or wireless station encountering a WLAN. In some cases, the WLAN operator may need an agreement with a service provider before the WLAN operator agrees to or is authorized to provide a service. An automated brokerage service may establish a binding legal contract between the WLAN operator and a service provider to define terms under which the WLAN operator may legally provide a service to a mobile device.

Figure 1:
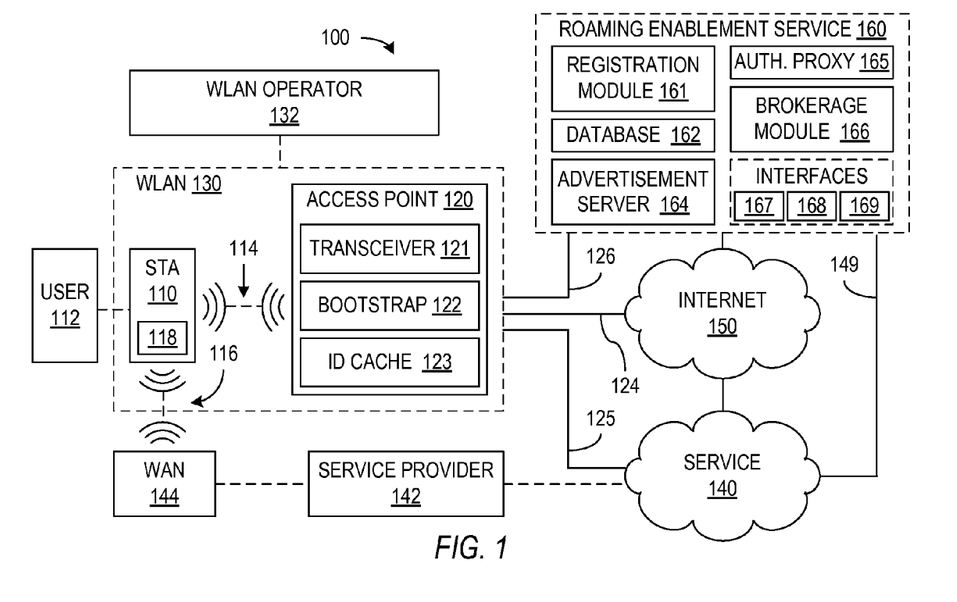
FIG. 1 shows a network system in which an access point may be automatically configured to provide a wireless station with desired network services.

FIG. 1 illustrates a system 100 in which a mobile wireless station 110 may encounter an access point 120 of a WLAN 130. Mobile wireless station 110 may be a communication device such as a mobile telephone, a smart phone, a pad computer, a laptop computer, or any other device that is capable of communicating with access point 120 through a wireless connection 114, e.g., an IEEE 802.11 wireless link 114. For example, mobile wireless station 110 may communicate with access point 120 using any of the IEEE 802.11 Wi-Fi standard protocols. In some cases, mobile wireless station 110 may also be able to communicate through a further wireless connection 116 with a wide area network (WAN) 144, which a service provider 142 may provide. For example, mobile wireless station 110 may be a telephone, an e-reader, or a pad computer able to communicate through mobile carrier infrastructure of WAN 144, but mobile wireless station 110 at least has local wireless capabilities, e.g., Wi-Fi capabilities, for communication with local area networks such as WLAN 130. For roaming among WLANs, mobile wireless station 110 may be configured or include configuration or an active module 118 that is used in a bootstrap process that allows wireless station 110 to connect to the same service through different WLANs.

Access point 120 represents hardware that allows wireless devices such as mobile wireless station 110 to connect to a network, for example, using Wi-Fi or related standards. In FIG. 1, access point 120 includes a wireless transceiver 121 such as a radio, a bootstrap module 122, and an ID cache 123 stored in memory of access point 120. Access point 120 may be as a standalone device, may connect to a router or other network hardware (not shown) via cable or a wired network, or may be integrated into a wireless router or other network equipment. In some implementations, WLAN 130 may employ multiple radio transceivers and a WLAN controller, and access point 120 may be distributed among multiple devices, e.g., implemented in a combination of a WLAN controller and one of the radio transceivers of WLAN 130. In FIG. 1, access point 120 includes hardware executing a bootstrap module 122 used in a process for providing services to visiting wireless stations. Bootstrap module 122 may alternatively be implemented or executed in other hardware of WLAN 130. In FIG. 1, bootstrap module 122 employs a server interface 126 over which access point 120 may communicate with roaming enablement services 160, a database 162, an ANQP server 164, an authentication proxy 165, or a brokerage module 166. In a HotSpot 2.0/Passpoint compatible implementation, interface 126 may also be used once the HotSpot 2.0/Passpoint process authenticates wireless station 110 with an authentication proxy 165 provided by roaming enablement services or with an authorization and accounting (AAA) server (not shown) associated with a service 140. Access point 120 may also establish Subscription Service Provider Network (SSPN) interfaces, either as a tunnel back 125 to services 140 of service providers 142 or as a direct connection 124 to the Internet 150. These SSPN interfaces 124, 125, and 126 may be dynamically established as part of the bootstrapping process. Services 140 or service providers 142 themselves may have a connection 149 to roaming enablement services 160 and the Internet 150.

WLAN 130 may further include one or more access points, computers, servers, or persistent storage. WLAN 130 may also have physical interfaces to the wired network, e.g., the Internet 150, and may have interfaces to other wireless networks as well, e.g. a combined WAN and WLAN. For example, WLAN 130 further includes one or more gateways to other networks such as the internet 150. In the specific configuration shown in FIG. 1, WLAN 130 uses connection 124 to the Internet 150, a service connection such as an SSPN tunnel 125 for communication with a service 140, and a server interface 126 for communication with roaming enablement services 160.

A WLAN operator 132, which may be a person or a legal entity, has legal control over WLAN 130 and may allow use of WLAN 130 for a fee or as a benefit to users such as a user 112 of mobile wireless station 110 when in an area of WLAN 130. For example, WLAN operator 132 may be the operator of a business such as a store, restaurant, or hotel and may operate WLAN 130 for customers or other users at the location of the business.

User 112 may desire or mobile wireless station 110 may be configured to access a service 140 of service provider 142 through any available Wi-Fi networks encounter during roaming. Service 140 represents a device or equipment that performs a desired function for wireless station 110. Ideally, Wi-Fi connections providing access to service 140 occur with the same level of ease and automation available in cellular networks. For example, if mobile wireless station 110 is a mobile telephone, mobile wireless station 110 may be configured to automatically switch from communicating through WAN 144 whenever a WLAN is able to provide access to the desired service 140 for data offload.

Service 140 may alternatively be a service such as a communication monitor or Internet filtering service that monitors or controls Internet content or other communications with wireless station 110. For example, a content-control service may provide a parent with a way to control a child's activity when using wireless station 110. A content-control service, for example, may allow a customer to block and filter Internet content that user 112 could otherwise access using wireless station 110 when roaming. In some other examples, service 140 could record browsing or place location or time limits on communications or game access through wireless station 110. A few other examples of functions of service 140 include: ad insertion in which service 140 may inject into the web content provided to wireless station 110 advertisements based upon attributes of user 112 or wireless station 110; web-page redirection in which service 140 may force web-requests from wireless station 110 to be redirected to specific locations for authorization purpose or simply to provide additional information; and differentiated services in which service 140 may provide certain traffic, such as voice or video, a different quality of service over other background or lower priority traffic. The examples of service 140 provided here are limited, and service 140 may alternatively perform many other functions for wireless device 110.

Service provider 142 may be a person or legal entity that controls services 140 and may have a contract defining terms under which service provider 142 provides service 140 to mobile wireless station 110, user 112, or a third party purchaser of service 140. In one example, service provider 142 may be a wireless telephone company that charges user 112 for access to WAN 144 and service 140.

Figure 2:
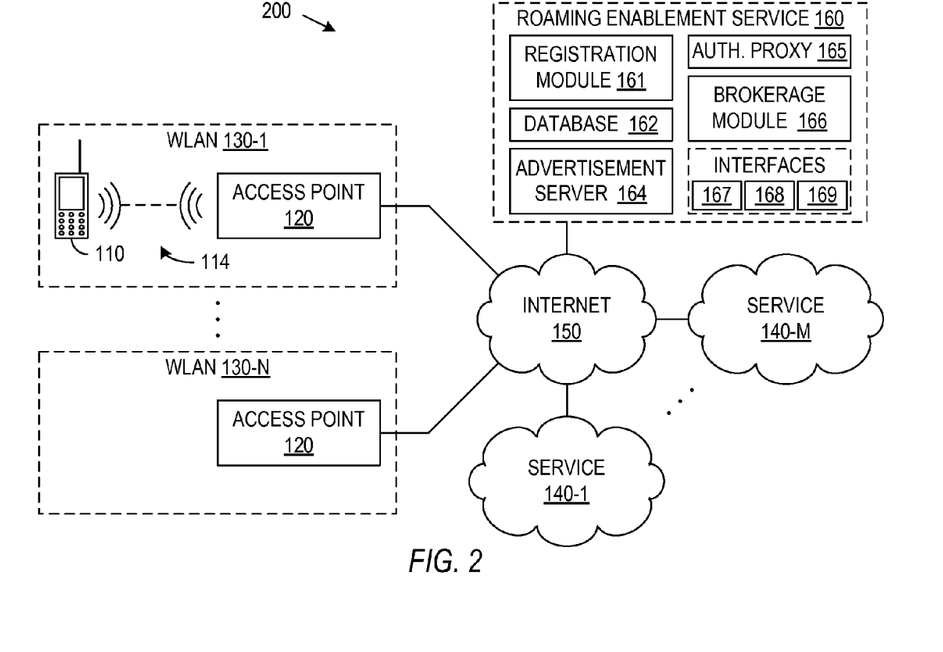
FIG. 2 shows a system including multiple wireless local area networks and a mobile wireless station that may roam among the wireless local area networks and use the wireless local area networks to access desired services.

FIG. 2 illustrates a system 200 including multiple wireless networks 130-1 to 130-N that may provide a wireless station 110 with access to one or more service 140-1 to 140-M. Each wireless network 130-1 to 130-N may be a network of a type similar or identical to wireless network 130 described above with reference to FIG. 1, and each service 140-1 to 140-M may be any types of services including but not limited to the types of services described above with reference to service 140 of FIG. 1. In general, WLANs 130-1 to 130-N may have different operators and generally have different geographical areas in which respective wireless networks 130-1 to 130-N are usable. FIG. 2 illustrates a situation in which wireless station 110 may move among WLANs 130-1 to 130-N and upon encountering a new one of WLANs 130-1 to 130-N may still want to access a desired one (or more) of services 140-1 to 140-M.

Systems 100 or 200 provide mobile wireless station 110 with the ability to authenticate for use of a service 140 through an access point 120 without requiring user 112 to interact with any WLAN 130. Access point 120 (or WLAN 130) may need appropriate configuration information to physically establish the connections between mobile wireless station 110 and service 140. Further, such access often requires a legal agreement, e.g., a roaming agreement, between a WLAN operator and the service provider providing the desired service 140, e.g., between WLAN operator 132 and service provider 142 of FIG. 1. Access point 120 in any of WLANs 130-1 to 130-N can employ a bootstrap module, e.g., a bootstrap module 122 as described with reference to FIG. 1, to communicate with roaming enablement services 160 in order to obtain configuration information or to broker an agreement between the WLAN operator of the WLAN and the service provider associated with one or more selected services 140-1 to 140-N.

Roaming enablement services 160 as shown in FIG. 1 or 2 may be implemented on a server system including one or more servers or network devices with appropriate communication hardware for communications. In the implementation of FIG. 1 or 2, roaming enablement services 160 includes a registration module 161, a database 162, an Access Network Query Protocol (ANQP) server 164, an authentication proxy 165, a brokerage service module 166, and interfaces 167, 168, and 169. Database 162 contains storage for lists of the services users may desire and may receive data during registration processes that registration module 161 conducts. In particular, a user 112, a service provider 142 providing a service 140 to wireless station 110, or a purchaser of the service 140 for wireless station 110 may employ application interface 167 to communicate with registration module 161 and create an entry in database 162, and each entry in database 162 may correspond to an identifier of wireless station 110 or user 112. An entry corresponding to an identifier may represent information associated with one or more of services 140-1 to 140-M that wireless station 110 or user 112 may access. Database 162 may also store configuration information respectively for services 140-1 to 140-M. As described further below, bootstrap module 122 in WLAN 130 may remotely access database 162 using application interface 168, provide an identifier, and receive back a list of services and associated configuration information. Although FIGS. 1 and 2 show database 162 as part of roaming enablement service 160 remote from WLAN 130, WLAN 130 may include a database that provides some or all of the information available from database 162, and roaming enablement services may not include database 162.

Roaming enablement services 160 may further provide advertisement server 164, e.g., an ANPQ server, for advertising services through access points 120 of WLANs 130-1 to 130-N. Alternatively, an advertisement server that an access point 120 uses may be implemented in the access point 120 or elsewhere in the WLAN 130 containing the access point.

Authentication proxy 165 may be a device that facilitates authentication of wireless station 110 or user 112 to service 140. For example, authentication proxy 165 may provide a Radius proxy service. Alternatively, wireless station 110 may connect to an authentication server of service 140 without an intervening proxy, so that authentication proxy 165 is not required in roaming enablement service 160.

Brokerage module 166 in one implementation further maintains accounts for WLAN operators 132 and service providers 142, and each account may be configured to represent standing terms under which a WLAN operator 132 or a service provider 142 is willing to provide or allow access to a service 140. An account with brokerage module 166 may further represent technical information such as the capabilities that WLAN 130 has or the capabilities that a service provider 142 requires of a WLAN 130 before allowing access to a service 140 through the WLAN 130. Brokerage module 166 can then automatically create legal agreements between a WLAN operator 132 and a service provider 142 if brokerage module 166 determines that the standing terms and capabilities of the WLAN 130 are consistent with the standing terms and performance requirements of a service 140. In an alternative implementation, brokerage module 166 receives contract offers, e.g., from a WLAN operator 132, and relay communications between a WLAN operator 132 and a service provider 142 until an agreement is reached or either party terminates the communications. Generally, the functions of brokerage module 166 are separate from the services of database 162, advertisement server 164, and authentication proxy 165, and brokerage module 166 may be provided alone or separate from database 162, advertisement server 164, and authentication proxy 165 or in any combination with one or more of database 162, advertisement server 164, and authentication proxy 165.

Different alternative implementations of network system 100 of FIG. 1 or system 200 of FIG. 2 may have components that are compliant with different protocols. In one exemplary implementation, access point 120 and wireless station 110 are IEEE 802.11u compliant.

For the IEEE 802.11u-compliant implementation, access point 120 may be configured as follows. The dot11InterworkingServiceActivated Management Information Base (MIB) object, which is part of the Simple Network Management Protocol (SNMP) MIB defined for IEEE 802.11u, is set to TRUE, indicating that the access point 120 supports IEEE 802.11u. This causes access point 120 to include the Interworking Information Element in probe-response and beacon frames. The Interworking Information Element allows wireless station 110 to know that the access point 120 supports IEEE 802.11u and may indicate further details about the available network services. Access point 120 may be configured with the IP address of an external ANQP server, so that access point 120 can forward ANQP request messages received from wireless station 110 to an external ANQP server, e.g., advertisement server 164, and receive and relay ANQP response messages in return. The IP address of a database 162 or a brokerage module 166 that may be used to look-up a user identity and determine the appropriate ANQP information to configure access point 120 for the wireless station as well as any information needed for access point 120 to establish an interface (e.g., a tunnel 125) to the SSPN of a service 140. The IP address of database 162, ANQP server 164, and brokerage module 166 may all be the same address, for example, if the functions of database 162, ANQP server 164, and brokerage module 166 are incorporated in a single system or device such as roaming enablement services 160.

Roaming enablement services 160 may be available and include database 162 of user identities and associated with services or service providers from which the user may like to obtain services. For example, roaming enablement services 160 or registration module 161 may assign IDs to the user during a registration process or processes. An assigned ID may be unique among IDs that roaming enablement services 160 assigns to users or wireless stations and may be represented by a unique value such as a universally unique identifier (UUID) as defined by IETF RFC 4122. Alternatively or additionally, a user or other party can provide an identity such as a MAC address of wireless station 110 to database 162 during a registration process or processes. Interface 169 may include the communication capabilities through which brokerage module 166 contacts various service providers 142 and propose a service offer on behalf of a WLAN operator 132. In particular, interface 169 may employ a secure connection 149 between brokerage module 166 and any service 140 or service provider 142. The service offer communicated may include information about wireless station 110, user 112, WLAN 130, or WLAN operator 132. Interface 168 may communicate ANQP information between ANQP server 164 and wireless station 110 after wireless station 110 makes an ANQP request. Interface 167 may employ a communication channel 126 to access point 120 or bootstrap module 122 over which database 162 or brokerage module 166 may receive offers or provide information about how to establish a connection to an SSPN. Roaming enablement services 160 could also maintain a connection (e.g., tunnel 149) to the SSPN and use other means, such as a Virtual Local Area Network (VLAN), to get the wireless station's traffic from access point 120 back to service 140.

Wireless station 110, which may roam into the vicinity of access point 120, may have a configuration 118 with the following attributes set. The InterworkingServiceActivated MIB object is set to TRUE, indicating that wireless station 110 supports IEEE 802.11u. This causes wireless station 110 to include the Interworking Information Element in probe request frames and generate ANQP request frames to perform network discovery and selection. Wireless station 110 may be further configured to connect to a hidden wireless network with an SSID configured to a unique value (e.g., the UUID that roaming enablement services 160 assigned to wireless station 110 or user 112) representing an identity of wireless station 110 or user 112. As noted above, the user identity may have previously been provided to user 112 by a one-time registration process with roaming enablement services 160. The hidden network may be configured to be the highest priority network in the selection algorithm of wireless station 110, so that wireless station 110 tries to connect to this network by sending a probe request. However, wireless station 110 may have different policies and may implement a different selection process using the principles described herein.

Figure 3:
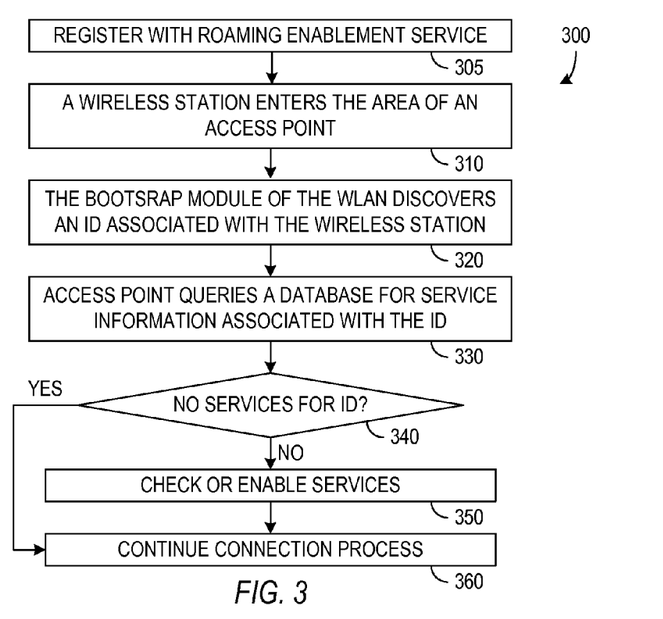
FIG. 3 is a flow diagram of bootstrap process in an implementation that allows automatic configuration of an access point according to the identity discovered from a new wireless station.

FIG. 3 is a flow diagram of a bootstrap process 300 in accordance with one implementation in which an access point of a WLAN can automatically obtain information or agreements needed for providing a wireless station with access to user specific services. As a preliminary step of process 300, a user, a service provider, or a purchaser of a service may register a mobile wireless station as in process block 305, so that the mobile wireless station is in a database. Registration process 305 may be a one-time process, while the remainder of process 300 may be repeated many times. The repeated portion of process 300 shown in FIG. 3 begins in process block 310 when a wireless station enters the area of an access point of a WLAN. Process block 310 may, for example, result from a user of the wireless station entering a geographical area sufficiently close for communication with the access point or from the user activating the wireless station sufficiently close to the access point.

Process block 320 illustrates a bootstrap module associated with an access point of the WLAN obtaining an ID for the user or the wireless station. In general, the method for determining the ID depends on the communication protocol the access point or wireless station employs. For Wi-Fi protocols, a wireless access point may transmit beacon messages, and the wireless station 110 may transmit probe messages. In one implementation, the access point may transmit beacon messages advertising the services that are available through the access point. The wireless device may reply to beacon messages or may transmit a probe signal requesting a particular service. With one technique for obtaining an identifier, the bootstrap module may extract a MAC address from any communications that the wireless station sends and may use the MAC address as all or part of the ID. With another technique for obtaining an identifier, the wireless station is configured to transmit probe messages containing an assigned UUID, and the bootstrap module may extract the UUID from a probe message and may use the UUID as all or part of the ID.

A wireless station that is Hotspot 2.0 compliant provides a MAC address and can be configured to use an assigned UUID without any hardware alterations of the wireless station. In process block 320, an access point can discover an ID from a conventional mobile wireless station that is properly configured. In an alternative implementation, the wireless station could be customized to enable any sort of protocol for conveying an identity that bootstrap process 300 may discover in process block 320 and use in enabling a service at a WLAN. For example, a mobile wireless station could be customized to send probe requests including a vendor specific information element that may be used as an identity employed in a bootstrap process. The implementations of bootstrap processes using a MAC address and/or an SSID such as described above do not require any hardware alteration of the mobile wireless station and thus may be used with wireless stations that comply with widely adopted standards.

The bootstrap module in process block 330 can issue a query seeking a list of services that may be associated with the ID. In general, a wireless station may broadcast multiple probe requests during the time that bootstrap process 300 is performed, and a bootstrap module performing may use a cache, such as ID cache 123 of FIG. 1, to contain information concerning one or more bootstrap processes that may be simultaneously in progress or previously completed. Process block 330 may be limited to avoid duplicate queries, for example, if a previous query for the wireless station has already been sent, whether or not the prior query completed or yielded a list of services. (The term "list" is used here in a broad sense to include an empty list, information for a single service or service provider, or information for multiple services or service providers.) A database may store the lists respectively associated with IDs. For example, one or more parties, e.g., roaming enablement services 160, may operate a database (or databases) and allow the user of the wireless station, a purchaser of a service for the wireless station, or a service provider to create a list of services that the wireless station may want to access through Wi-Fi networks during roaming. Typically, the database (or databases) would be a remote resource, e.g., may be a cloud resource, but the WLAN in which the bootstrap process is performed could alternatively have a local database on site. If the (remote or local) database has an entry for the ID, the database may respond to the access point and provide a list of services specific to that ID.

The bootstrap module in decision block 340 determines whether the list for the ID queried is empty or includes services or service providers. If the list is empty, the access point and the wireless station may ignore the probe request (and following probe requests from the same device) or may continue a network connection process in a process block 360. For example, the access point may reply to the probe message from the wireless station or may otherwise identify the services currently accessible through the WLAN.

If the list of services for the identifier is not empty, the bootstrap module in a process block 350 can check or enable services. In particular, the bootstrap module can check whether a listed service is already available through the access point, can be enabled for access through the access point, or cannot currently be enabled through the access point. If a service is already available, nothing further need be done for that service, and the access point may inform the wireless station of the availability of the service, e.g., through a beacon message or a probe reply. If a listed service is not currently available, the bootstrap module can determine whether the configuration information and legal agreements for providing the service through the WLAN can or cannot be obtained, and if the configuration information and legal agreements are obtained, the bootstrap module can configure the access point so that the wireless station is informed of the newly available service. For example, the bootstrap map module can configure the access point to transmit beacon messages advertising the service or to respond to a probe request by indicating that the service is available. In some implementation, where an access point can simultaneously provide only a limited number of services, the bootstrap module may disable a service that is not of interest to any wireless stations currently in the geographical area of the access point in order to enable the new service for the wireless station entering the service area. If a service in the list for an ID is not currently available and the necessary agreement or configuration information cannot be obtained, the access point will not enable the service.

Figure 4:
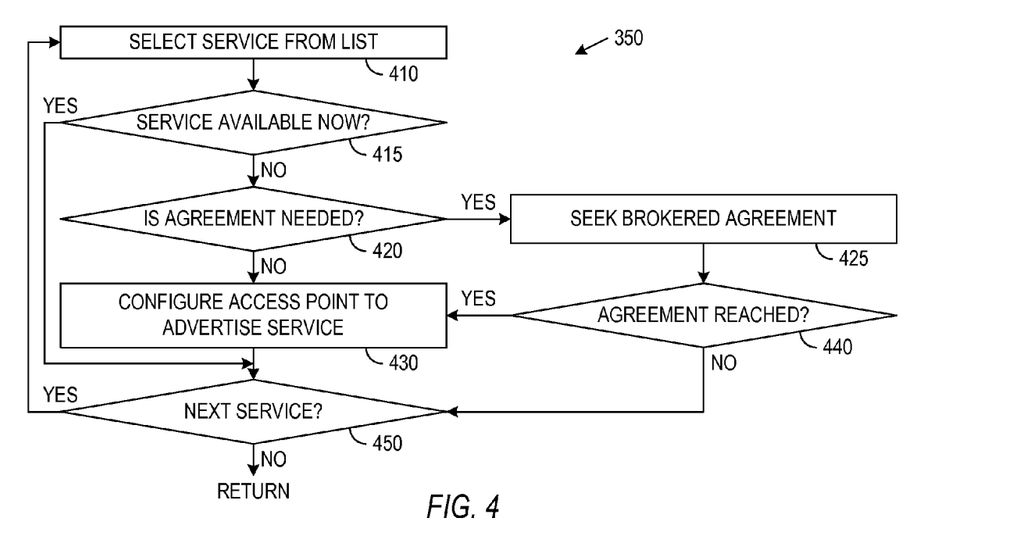
FIG. 4 is a flow diagram of a process of checking or enabling services associated with an identity from a new wireless station.

FIG. 4 shows one specific implementation of a process 350 in which a bootstrap module can process a non-empty list of services associated with an ID newly obtained from a wireless station. In an initial process block 410, the bootstrap module selects a service from the list of services associated with the ID and then, in decision block 415, checks to determine whether the service is already enabled for access through the access point. If the selected service is already available, bootstrap module can check for a next service from the list. If the selected service is not available, the bootstrap module, in decision block 420, checks to determine whether an agreement is required in order for the WLAN to provide the selected service. An agreement may not be required, for example, if the WLAN operator already has an agreement with the service provider that provides the service or if neither WLAN operator nor the service provider has any restrictions, requirements, or conditions on providing the service through a WLAN. If no agreement is needed, the bootstrap module can configure the access point or the WLAN to offer or provide access to the selected service.

If an agreement is needed, the bootstrap module executes process block 425 and contacts a brokerage service to seek an agreement with the service provider for the selected service. As noted above, the brokerage service may be a cloud resource that maintains data indicating the requirements that service providers have for WLANs that provide the service or data indicating terms, e.g., maximum payments that the service provider is willing to pay WLAN operators that provide access to the service. The brokerage service may also maintain data indicating the capabilities of WLANs and the terms, e.g., minimum payments, under which the WLAN operators are willing to provide services. (The bootstrap module may alternatively provide to the brokerage service the technical information concerning the WLAN or the contract terms the WLAN operator requires when the bootstrap module seeks an agreement.) In yet another alternative implementation, the brokerage service sends to the service provider an agreement proposal indicating the capabilities of the WLAN and terms of the WLAN operator and then waits for the service provider to respond to the proposal. The service provider may have an automated system for accepting or rejecting such proposals or for transmitting a counter proposal to such proposals.

The brokerage service in decision block 440 determines whether an agreement between the WLAN operator and the service provider can be reached. In one implementation, the brokerage service determines whether the capabilities of the WLAN meet the requirements of the service provider and whether the contract terms of both parties are consistent. (The brokerage service may, for example, set the monetary terms of the agreement in any desired manner, e.g., including selection of a payment in a range from the WLAN operator's minimum payment to the service provider's maximum payment.) Having been pre-authorized by the WLAN operator and the service provider, the brokerage service can inform both the WLAN operator and the service provider that an agreement has been made. In another implementation, the brokerage service in decision block 440 waits for the service provider's response to an agreement proposal (or waits for a conclusion to back-and-forth communications the brokerage service mediates between the WLAN operator and the service provider) to determine whether an agreement has been reached.

If an agreement was reached, the bootstrap module can perform a process block 430 to configure the access point as needed to provide the service access through the WLAN per the terms of the agreement. The brokerage service may provide configuration information to the bootstrap module, or the bootstrap module may have the configuration information from another source, e.g., from a database. If no agreement was reached, access to the service through the WLAN may not be enabled.

Once the bootstrap module has configured the WLAN to enable (or not) access to the selected service, the bootstrap module in decision block 450 determines whether to branch back to process block 410 and select another service from the list associated with the ID. Process 350 can thus continue to enable or not each of the services in a list for an ID. Once the services for an ID have been checked or enabled, the access point in process block 360 of FIG. 3 may continue the connection process for the wireless station. For example, the wireless station may perform a selection algorithm and associate with the access point in order to next perform authentication against the selected service provider.

Figure 5:
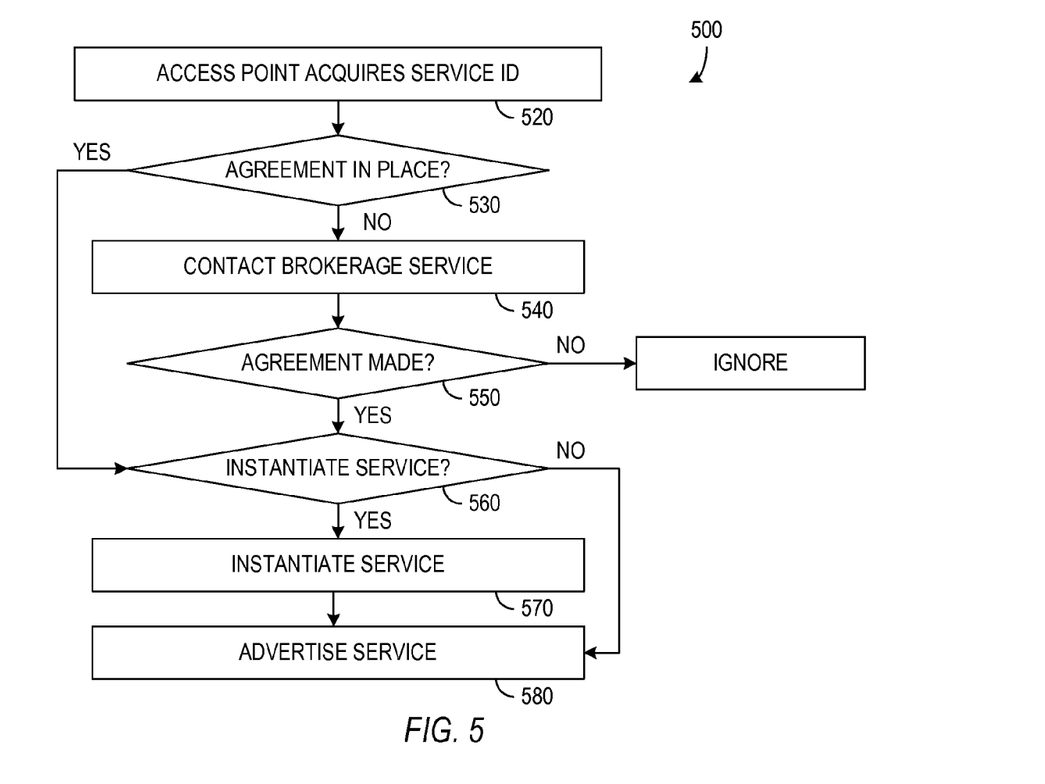
FIG. 5 is a flow diagram of a bootstrap process for automatically obtaining an agreement with a service provider permitting a WLAN operator to provide a service.
Figure 6:
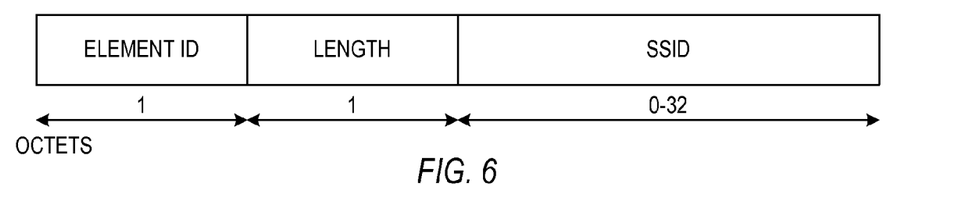
FIG. 6 is a block diagram of an SSID information element.

FIG. 5 is a flow diagram of a bootstrap process 500 that employs a service identifier and a roaming enablement service to obtain an agreement that enable a WLAN to provide access to a service corresponding to the service identifier. In process 500, a process block 520 provides an access point of the WLAN with an ID of a service, not the ID of a mobile wireless station or a user. For example, an SSID in a probe requested is conventionally an identifier of a desired service, and a boot strap module of the access point may acquire the service ID directly from a probe request received by the access point. FIG. 6 illustrates an information element of a probe request frame, and the information element includes an element ID field, a length field, and an SSID field. The SSID field may contain the network or service name that an access point can extract from the information element in a probe request. Alternatively, an access point performing process block 520 can obtain a service ID through a query to a database using a MAC address or a UUID of the wireless station as described above with reference to FIG. 3.

A decision block 530 may use the service ID to determine whether a legal agreement permits the WLAN to provide a connection to the service corresponding to the service ID. If a service agreement is already in place, a decision block 560 determines whether the service needs to be instantiated at the access point, and if so, a process block 570 instantiates the service, e.g., using information that may have been previously provided when the agreement was reached or information that may be sought from a database such as database 162 of FIG. 1. Once the service has been instantiated in block 570 or if block 560 found the service was already instantiated, a process block 580 can advertise the service, so that a mobile wireless station may connect, authenticate, and potentially use the service through the access point of the WLAN.

If decision block 530 determines that the WLAN operator does not have a legal agreement that permits the WLAN to provide a connection to the service, the access point in process block 540 automatically contacts a brokerage service, e.g., brokerage module 166 of FIG. 1, with an offer to provide the connection. The brokerage service can then attempt to create an agreement. For example, the brokerage service can forward the offer from the access point to the service provider associated with the service ID and mediate communications (if any) leading to an acceptance from the service provider. Alternatively, the WLAN operator and the service provider may have preauthorized the brokerage service to automatically create an agreement if the WLAN meets performance requirements of the service provider and the service provider meets the financial requirements of the WLAN operator. Accordingly, an agreement may be reached without the delay inherent in human intervention on behalf of the WLAN operator or the service provider. If a decision block 550 determines an agreement has been reached, decision block 560 may determine whether the service needs to be instantiated, and block 570 can instantiate the service, e.g., using information that the brokerage service provided when the agreement was made. With the service instantiated, process block 580 can advertise the service, and the service can be provided to roaming wireless stations in a seamless manner that is convenient for the user of the mobile wireless station.

If decision block 550 determines that an agreement between the WLAN operator and the service provider cannot be quickly established, the access point may ignore requests for the service.

Figure 7:
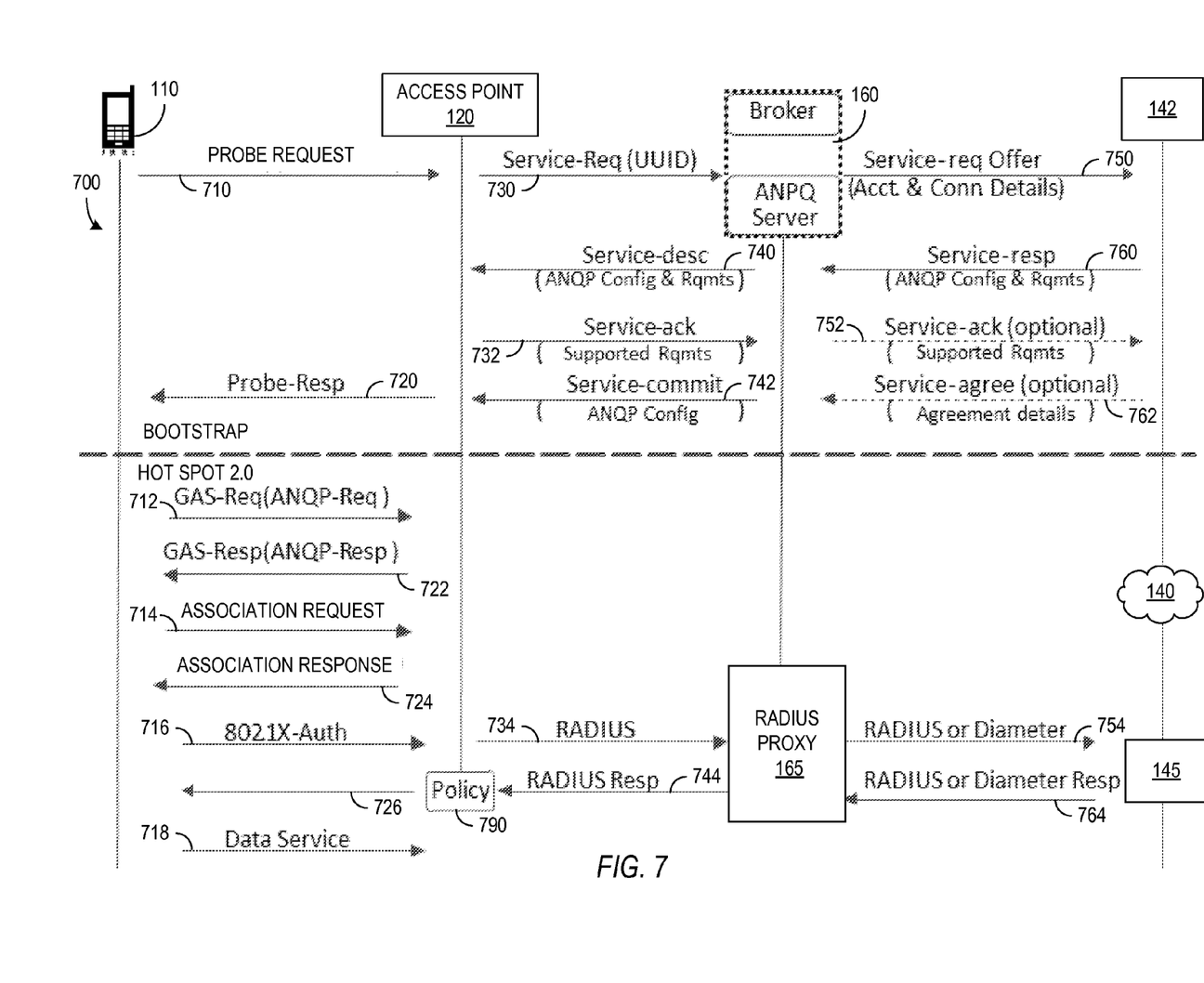
FIG. 7 illustrates information flow in a connection process using a WLAN and a mobile wireless station with HotSpot 2.0 support.

FIG. 7 illustrates information flow in a bootstrap process 700 in a specific implementation in which a network supports HotSpot 2.0. Process 700 is described with reference to the example equipment of FIG. 1 but more generally can be implemented in a variety of hardware configurations.

Wireless station 110, when roaming, may periodically send out probe requests, including a probe request 710 that access point 120 receives. In one implementation, wireless station 110 is pre-configured with a high priority selection rule to connect to a hidden network having an SSID that is unique to the user of wireless station 110. As a result, wireless station 110 may send a probe request 710 including an SSID representing a unique user identity (UUID) that has been registered with roaming enablement services 160. The UUID may identify mobile wireless station 110 or the user and may also provide additional information representing the user's preferred service provider or other information. Instead of containing an UUID, probe request 710 may include an SSID representing a network or service.

FIG. 6 illustrates the format of an information element in a probe request frame that is compliant with HotSpot 2.0. The information element generally includes an element ID field, a length field, and an SSID field. The Element ID field may be used to identify that the information element is for an SSID. The length field specifies the number of octets that will appear in the SSID field. The length is set to 0 (zero) to indicate a wildcard SSID. The SSID field normally contains the network name that wireless station 110 would like to join and is typically an ASCII string identifying the desired network, e.g., "Linksys." In bootstrap process 700, the SSID field holds a 32-byte value that is typically a printable/readable ASCII string. Generally, an access point may not be able identify with complete accuracy that an SSID field is a UUID. However, UUIDs may be limited to using a unique encoding that permits identification of SSID values that are clearly not a UUID. When the SSID may be a UUID, process 700 may treat the SSID as a UUID for a database query as described further below.

The bootstrap module for the access point 120 receiving probe request 710 can package-up the SSID information, the MAC address of wireless station 110, or other additional information about the current state of WLAN 130 and send the packaged information as a service request 730 to roaming enablement services 160, e.g., over a TCP connection. The protocol between access point 120 and brokerage module 166 can include parameters necessary for the service provider 142 to understand the environment of access point 120. Such parameters may include: the UUID of user 112 or wireless station 110; the MAC address of the wireless station 110; a current number of wireless stations associated with access point 120; the speed of the uplink to the access point; the location of access point 120; the availability of Quality of Service (QoS) traffic classes and current bandwidth allocation of the uplink or current bandwidth utilization of the uplink; other network analytical data to assess the quality of the environment of WLAN 130; and other capabilities of access point 120 that may assist service provider 142 in determining how policies of the service provider can be enforced.

Roaming enablement services 160 or particularly database 162 performs a query or lookup operation based on service request 730 to determine which services 140 or service providers 142 the wireless station 110, user 112, or the purchaser of services for wireless station 110 may desire. For example, database 162 may provide details on how to contact a service provider 142 in order to dynamically establish a roaming agreement between the service provider 142 and the WLAN operator 132. Database 162 may originally be created through a sign-up process between roaming enablement services 160 and one or more of user 112, the purchaser of services, or service provider 142. During this process, the party signing up may indicate which services 140 or service providers 142 are preferred and under what circumstances services 140 should be made available. During the sign-up process, roaming enablement services 160 may provide the party signing up with a UUID and with instructions or a process to configure wireless station 110 so that wireless station uses the UUID in subsequent probe requests.

Roaming enablement services 160 in response to service request 730 extracts details concerning service(s) or service provider(s) from database 162. For each service, roaming enablement services 160 may then discover that a roaming agreement is already in place between WLAN operator 132 and the service provider 142 providing the service 140. In this case, brokerage module 166 may choose to not contact the service provider 142 and may simply rely on the existing roaming agreement. Otherwise, brokerage module 166 may construct a service-offer message 750 and send service-offer message 750 to the service provider 142 or multiple service providers 142 if multiple arrangements are associated with wireless station 110. The details of service-offer message 750 may include information necessary to broker an agreement with the WLAN operator 132 as well as provide details about the current state of WLAN 130.

A service provider 142 may want to assure that the connectivity experience for user 112 with WLAN 130 is acceptable and supports the necessary policies of service provider 142. Service offer 750 from brokerage module 166 may thus contain pertinent information for service provider 142 to make a decision on the offer from WLAN operator 132. Service offer 750 may also contain information about any financial transaction that takes place because of the roaming agreement. The service provider 142 may send a service agreement message 762 if the agreement is acceptable, and based on service agreement message 762, roaming enablement services 160 can return a service commitment message 742 to WLAN 130. Alternatively, service provider 142 may respond to service offer 750 with a service response 760 indicating ANPQ configuration information and requirements that WLAN 130 must meet for the agreement. Roaming enablement services 160 can forward service response 760 as a service description 740 to the WLAN and act as an intermediary for acknowledgements 732 and 752. Brokerage module 166 may work on behalf of the WLAN operator 132, e.g., per prior obtained preferences, to agree to settlement terms for supporting user 112 on WLAN 130.

Service provider 142, as noted above, may agree to service offer 750 with a service response 760 that contains all of the necessary information for access point 120 to properly respond to future ANQP messages from wireless station 110. Service provider 142 may also reply with a service response 760 that specifies resource requirements, a service level agreement or any financial information that service provider 142 would like to confirm with the WLAN operator 132 before the agreement can be put in place.

If service provider 142 accepts service offer 750, brokerage module 166 may configure ANQP server 164 with the information from service response 760. As noted above, ANQP server 164 may be resident with brokerage module 166 or may be within access point 120 or a WLAN controller orchestrating many access points (not shown). In FIG. 7, brokerage module 166 creates a service description 740 containing configuration information for the ANQP server and any other required parameters on access point 120 (e.g. virtual SSIDs, etc).

If service provider 142 would like to confirm that WLAN 130 can meet additional requirements of the agreement, service response 760 may contain those requirements and brokerage module 166 can request that the WLAN operator 132 reserve the resources to meet the requirements.

Access point 120 may receive a service response message 740 from brokerage module 166 that allows access point 120 to install the necessary configuration to support the subsequent access, e.g., HotSpot 2.0/Passpoint, and to process and support any other requirements of service provider 142. Access point 120 can respond to brokerage module 166 with a service acknowledgement message 732 that indicates access point 120 is ready to proceed with the next step of coaxing wireless station 110 to ultimately send an ANQP to select its desired services. If service provider 142 had requested confirmation of additional requirements from the WLAN operator before agreeing to service, the brokerage module 166 may send a service acknowledgement message 752 to service provider 140. Service provider 142 can then confirm the agreement with WLAN operator 132 by responding with a final service agree message 762. The exchange of messages 752 and 762 may only be required if service provider 142 has requested additional requirements in service response 760. Otherwise, service response message 760 may have indicated that service provider 142 agreed to the original service request 750.

Brokerage module 166 may send a final service commit message 742 to access point 120 to allow access point 120 to implement policies 790 that meet the requirements of the agreement and to send a probe response 720 to wireless station 110. Since wireless station 110 originally performed a probe request 710 for the special hidden SSID, wireless station 110 should not associate with that SSID but rather should move on to subsequent rules in the selection policy of wireless station 110. Accordingly, access point 120 may respond with a probe response 720 that does not contain the original SSID, but includes the Interworking Information Element letting the wireless station know that access point 120 supports IEEE 802.11u. Wireless station 110 then fails to locate the desired 'hidden' SSID and may move on to selecting other services by either issuing another probe request (not shown) that specifies a broadcast SSID or by sending an ANQP request 712 to access point 120.

Wireless station 110 and access point 120 can participate in the Generic Advertisement Service (GAS) and also the Access Network Query Protocol (ANQP) in compliance with HotSpot 2.0. In particular, wireless station 110 may issue an ANQP request 712 to the WLAN 130 in order to obtain from an ANQP response 722 a list of service providers that have roaming agreements with WLAN operator 132. At this point, the bootstrap part of process 700 has already configured access point 120 for access to the service providers 142 that user 112 desires. ANQP response 722 to wireless station 110 may contain a list of identifiers for services or service providers, so that wireless station 110 may proceed to the next step of selecting a network with which to connect.

The use of the ANQP protocol may be considered part of network selection, but wireless station 110 can use the ANQP protocol to obtain more information when selecting a network. For example, once wireless station 110 has a list of candidate networks, wireless station 110 can use its own local policy to select among available Wi-Fi networks and may use the ANQP protocol to obtain information for the selection process. The information within the ANQP response 722 may provide details about the costs associated with using a service, the speed and load of the current uplink as well as details about how to authenticate, e.g., what authentication methods are supported. Wireless station 110 may process the received list of SSIDs and associated service providers (available in the received ANQP response messages 722) and choose the network that best fits the wireless station's policy (e.g., choose free networks over pay networks) and also matches the authentication credentials that the wireless station currently has.

Once a network service has been selected, wireless station 110 will associate with WLAN 130 through an association process including a request 714 from wireless station 110 and a response 724 from access point 120 and then perform an authentication process, which the selection process may have specified. The authentication process may typically involve IEEE 802.1X messages 716 and 726 with credentials that identify service provider 142. The credentials may be part of a Subscriber Identity Module (SIM) in a phone or a username/password containing a Network Access Identifier (NAI) realm (defined in IETF RFC 2486). Both of these credentials are capable of identifying the authentication servers for the service 140 that has been selected. Wireless station 110, access point 120, and the authentication server 145 may participate in authenticating wireless station 110 for access. In the implementation illustrated in FIG. 7, roaming enablement service 160 provides an authentication proxy 165 such as a Radius proxy, and the authentication process includes requests 734 and responses 744 between access point 120 and authentication proxy 165 in roaming enablement service 160 and requests 754 and responses 764 between authentication proxy 165 and authentication server 145 associated with service 140. Since the authentication server 145 capable of authorizing wireless station 110 may be part of a network service provider's network including service 140, the authentication request may be routed through various gateway and proxy devices. More generally, any or no authentication process may be employed.

Data service 718 may commence when authentication is complete. Terms of the agreement between WLAN operator 132 and service provider 142 may include details of any subsequent financial transactions or settlement. Service usage and accounting can be handled in a conventional matter, e.g., in accordance with the HotSpot 2.0/Passpoint procedures of the connection. For example, brokerage module 166 may act as a Radius proxy and gateway, delivering accounting records to the service providers as is standard practice today. In particular, wireless station 110 may authenticate with the service provider's authentication server 145 using the RADIUS protocol. Sometimes RADIUS is converted to DIAMETER to support certain cellular providers, while Wi-Fi access points typically support RADIUS. In either case, brokerage module 166 may act as a 'middle man' between wireless station 110 and service provider 142, shuttling or routing the RADIUS messages, e.g., messages 734 and 744, back and forth, and thus function as a RADIUS Proxy 165. IETF RFC 2865, which has been most recently updated by IETF RFC 6929, defines the function of a RADIUS proxy.

Figure 8:
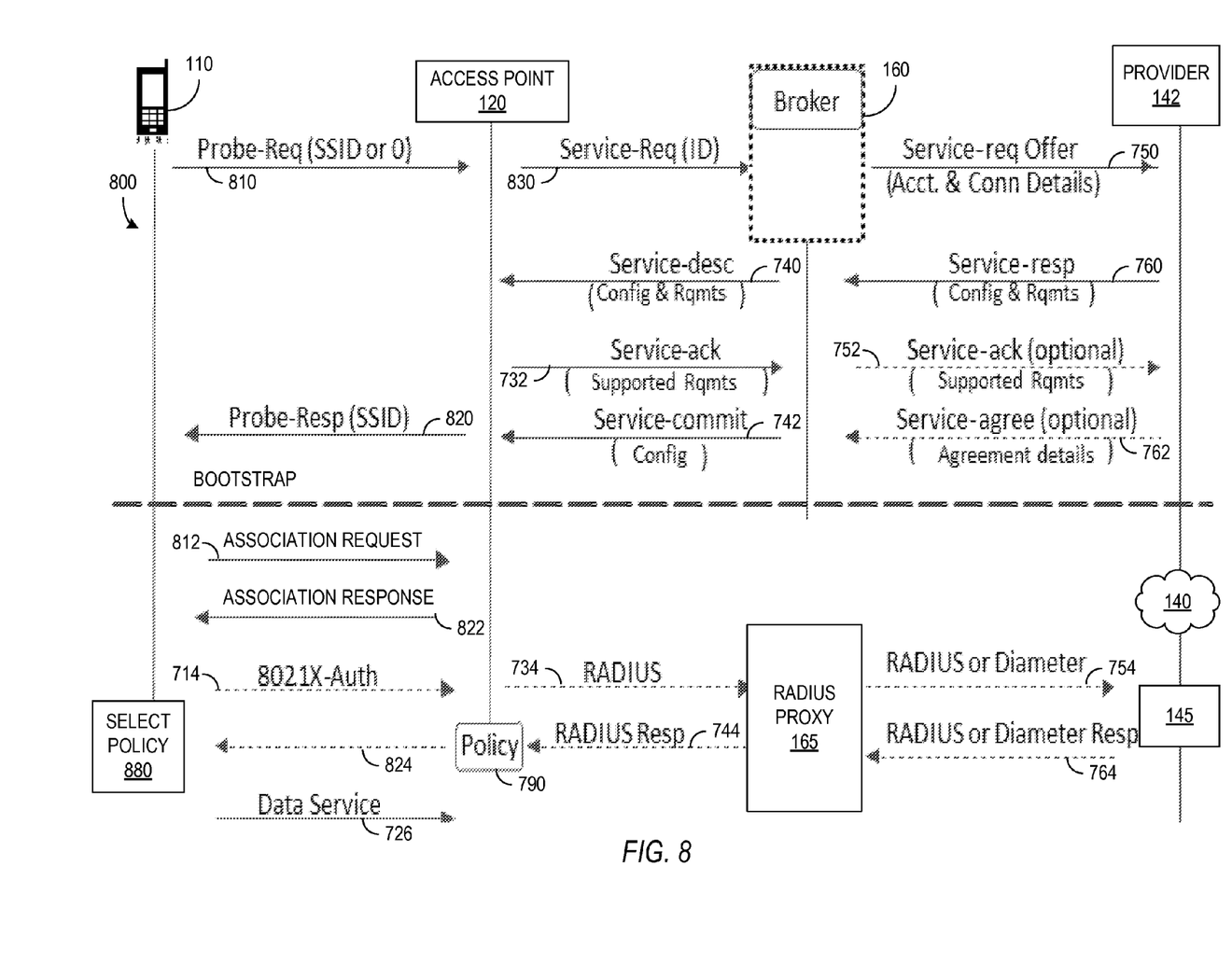
FIG. 8 illustrates information flow for an SSID bootstrap process using a WLAN or a mobile wireless station without HotSpot 2.0 support.

FIG. 8 illustrates information flow in an implementation of a bootstrap process 800 for connection for a wireless station 110 that does not support HotSpot 2.0/Passpoint. In this case, wireless station 110 does not support the dot11InterworkingServiceActivated MIB object and the selection process within wireless station 110 is based upon the SSID advertised by access point 120. An objective of process 800 may be to configure access point 120 with the necessary information to respond to a probe request 810 with a probe response 820 in order to coax wireless station 110 to automatically select the service 140 associated with an SSID returned in the probe response 820. The mobile user 112 presumably has previously registered with brokerage module 166 and has specified which SSIDs are desired and which wireless station MAC addresses may be used to connect to the network.

In the example of FIG. 8, wireless station 110 may search for a desired network by issuing a probe request 810 that either includes a specific SSID or includes the wildcard SSID (a length value of 0). The SSID could be configured to be the UUID as described above, could simply be a desired SSID, or could be a wildcard SSID. If access point 120 is not currently hosting the SSID specified in probe request 810, access point 120 can package up information from probe request 810 in a service request 830 sent to brokerage module 166. If the SSID that user 110 specified in probe request 810 is not a UUID, brokerage module 166 can use the MAC address as an identity to look up the user's service preferences or use the SSID to look up a service. Service offer 750 and negotiations, e.g., messages 760, 740, 732, 752, 762, and 742, exchanges among brokerage module 166, service provider 142, and access point 120 may be the same as described above with reference to FIG. 7. However, service response 760 from service provider 142 needs to include the SSID when wireless station 110 issued a probe request 810 with the wildcard SSID.

Once an agreement has been reached, brokerage module 166 has all the information necessary to configure access point 120 or WLAN 130 to support the network service desired by wireless station 110 as required by service provider 142. This configuration allows access point 120 to create an instance of the desired network service (sometimes called a virtual access point) and respond to wireless station 120 with a probe response frame 820 that includes the desired SSID. This response 820 may coax the wireless station's selection process 880 to choose access point 120 and transition to a normal connection process, e.g., association request 812 and association response 822. Wireless station 110 may associate with access point 120 and begin the authentication process (if required), e.g., IEEE 802.1X authorization 714 or simply begin data service 726. Access point 120 can continue to operate and support all standard functions of the virtual access point while wireless station 110 remains connected. The instance of the network service may be torn down some time after wireless station 110 disassociates.

In summary, this disclosure describes dynamically connecting users with their preferred service provider using mechanisms that initialize the configuration needed for existing processes to proceed as normal. The mechanisms include a brokerage service between the WLAN operator and the service provider, protocols to exchange necessary information and the use of the SSID field of a probe request to carry the end user's identity.

Each of modules disclosed herein may include, for example, hardware devices including electronic circuitry for implementing the functionality described herein. In addition or as an alternative, each module may be partly or fully implemented by a processor executing instructions encoded on a machine-readable storage medium.

Some implementations can be embodied in a machine-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although particular implementations have been disclosed, these implementations are only examples and should not be taken as limitations. Various adaptations and combinations of features of the implementations disclosed are within the scope of the following claims.

What is claimed is:

1. A process including:
a mobile wireless station encoding in a service set identifier (SSID) field of a probe request a unique user identifier that an enablement service assigned to the mobile wireless station;
operating an access point of a wireless network to:
receive the probe request from the mobile wireless station in an area of the access point;
in response to the probe request, communicate to the enablement service a service request containing information extracted from the probe request and identifying the mobile wireless station;
receive in response to the service request service information identifying a service associated with the mobile wireless station; and
use the service information to enable the mobile wireless station to contact the service through the access point, and
the enablement service brokering between an operator of the wireless network and a service provider providing the service an agreement that controls terms under which the wireless network provides access to the service, where the brokering occurs before the mobile wireless station completes connection to the access point.

2. The process of claim 1, further comprising the enablement service identifying the service by querying a database of services that are associated with mobile wireless stations.

3. The process of claim 2, further comprising the enablement service using a MAC address provided in the service request in identifying the service.

4. The process of claim 2, further comprising the enablement service using an identifier provided in the service request in identifying the service, wherein the identifier is in the probe request that the access point received, and the access point included the identifier in the service request.

5. The process of claim 1, wherein the access point comprises a Passpoint device.

6. The process of claim 5, wherein the mobile wireless station is a second Passpoint device.

7. A process comprising:
registering a mobile wireless station at a roaming enablement service, wherein registration associates the wireless station with a service;
configuring the mobile wireless station to encode a user identifier in a service set identifier (SSID) field of initial probe requests sent upon encountering wireless networks, wherein the enablement service associated the user identifier with the wireless station during the registering of the mobile wireless station;
the enablement service receiving the user identifier of the mobile wireless station from an access point that determined the user identifier from an initial probe request from the mobile wireless station;
the enablement service using the user identifier to identify the service associated with the wireless station;
the enablement service brokering between an operator of a wireless network including the access point and a service provider providing the service an agreement that controls terms under which the wireless network provides access to the service, where the brokering occurs before the mobile wireless station completes connection to the access point; and
the access point receiving from the enablement service information that enables the access point to respond to the initial probe request and provide the mobile wireless station with a connection to the service.

8. The process of claim 7, wherein the mobile wireless station is a Passpoint device.

9. A wireless access point comprising:
a transceiver to receive probe requests from wireless stations; and
a hardware executing bootstrap module that upon receipt of an initial probe request from a wireless station, determines a unique user identifier that was encoded in a service set identifier (SSID) field of the probe request and generates a service request to a roaming enablement service, wherein:
the service request includes information that is determined from the initial probe request and identifies the wireless station;
the bootstrap module uses a response from the roaming enablement service to identify a service associated with the wireless station and to seek enablement of the service for connection of the wireless station; and
the roaming enablement service brokers an agreement between an operator of the wireless access point and a service provider providing the service, the agreement controlling terms under which the operator provides access to the service, where brokering the agreement occurs before the mobile wireless station completes connection to the wireless access point.

10. The wireless access point of claim 9, wherein the information that the bootstrap module includes in the service request comprises a MAC address extracted from the initial probe request.

11. The wireless access point of claim 9, wherein the access point is a Passpoint device.

* * * * *